May 29, 1934.    R. F. DIRKES    1,960,577
PROJECTING SYSTEM
Filed Sept. 2, 1932
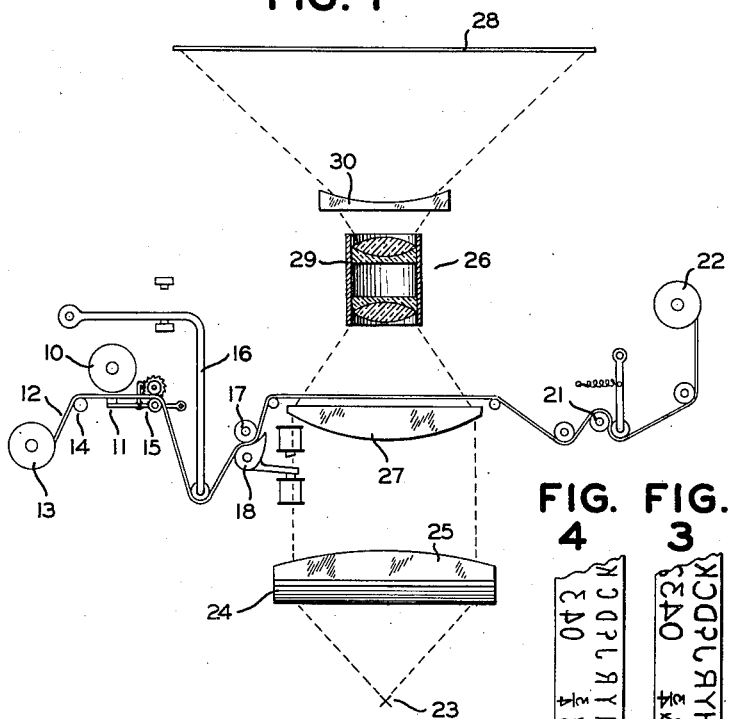
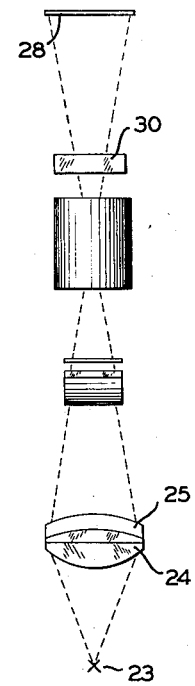
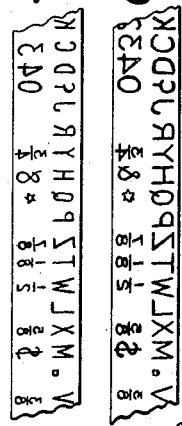
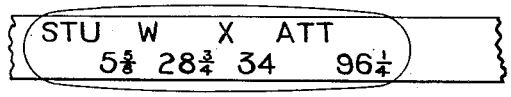
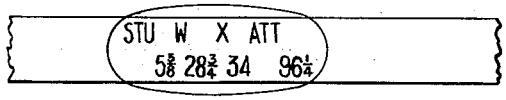
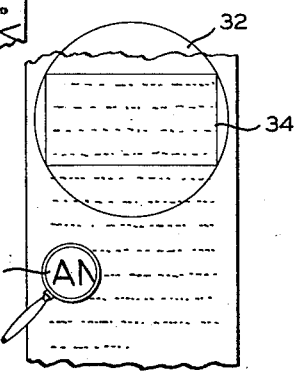
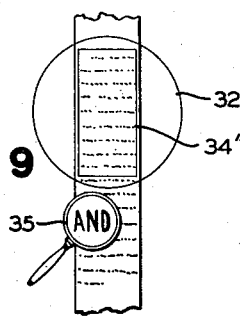
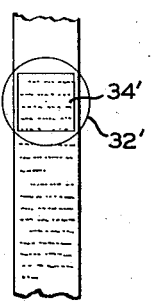
INVENTOR
R. F. DIRKES
BY
Eugene C. Brown
ATTORNEY Patented May 29, 1934

1,960,577

UNITED STATES PATENT OFFICE 1,960,577

PROJECTING SYSTEM

Robert F. Dirkes, Jamaica, N. Y., assignor to The Western Union Telegraph Company, New York, N. Y., a corporation of New York Application September 2, 1932, Serial No. 631,562

5 Claims. (Cl. 88—24)

This invention relates to a projecting system and more particularly to the projection of elongated objects, such as ticker tape, on to a screen in enlarged characters.

In stock ticker tape projectors, now in commercial use, the length of tape projected at any instant is approximately five inches. The width of the tape is approximately three-quarters of an inch. Preferably it is composed of cellophane or other transparent or translucent material. In order to obtain a distinct image on the screen of the characters appearing on the tape, it is essential that the tape be illuminated evenly and brilliantly throughout its entire length. Heretofore, difficulty has been experienced in obtaining the required degree of illumination of the tape.

In a co-pending application of R. F. Dirkes and F. H. Clark, Ser. No. 540,474, filed May 27, 1931, and entitled "Optical system for ticker tape projectors", a system is shown for obtaining an elliptical light beam approaching the shape of the portion of the tape to be projected at any instant. This arrangement has proven highly satisfactory in commercial projectors and by means thereof a length of tape of seven and one-half inches is projected with exceptional uniformity and intense illumination, thereby permitting the showing of approximately ten quotations at any instant.

The present invention has for its object to enable a still greater number of quotations to be projected at any time or to permit the same number of quotations to be projected with greater ease.

Other objects and advantages will hereinafter appear.

In accordance with the present invention the characters printed on the tape are compressed longitudinally of the tape, that is, in width so that a definite number of characters occupy a shorter length than heretofore, the vertical dimension of the characters, preferably remaining unchanged. Upon projection the characters are magnified to a greater degree along the longitudinal dimension of the tape than transversely thereof so that the images appear in their proper proportion upon the screen.

In this manner the length of tape, which it is necessary to illuminate at any instant, is reduced thereby decreasing the difference between the longitudinal and transverse dimensions of the area of illumination and hence simplifying the illuminating problem and enabling the tape to be more uniformly illuminated over its full projected length. If desired the same length of tape may be illuminated, as heretofore, thereby enabling a greater number of characters to be projected on the screen. This requires, of course, the use of a correspondingly longer screen.

The invention is also applicable to page projectors in which a complete page or a plural number of lines is projected at any instant. In this case, the printing is compressed transversely of the sheet enabling a sheet of less width to be used, and on projection greater magnification is employed transversely of the sheet than vertically thereof.

The disproportionate magnification of the transverse and longitudinal dimensions of the object is obtained by using a lens in the objective surface, having a cylindrical surface whereby the diverging rays entering the lens in the plane of the axis of said surface pass through with their divergence unchanged whereas the divergency of those rays entering the lens in a radial direction with respect of said surface is increased. The lens is placed with its axis transverse to the dimension of the object which it is desired to magnify most extensively.

The invention will be best understood by reference to the accompanying drawing in which:

Figure 1 is a diagrammatic view representing a front elevation of a projecting system embodying the invention;

Figure 2 is a diagrammatic view representing a side elevation of the projecting system;

Figure 3 shows a normal arrangement and proportioning of the characters of a ticker typewheel, in developed form;

Figure 4 is a similar view showing characters compressed in width on the typewheel;

Figure 5 is a section of tape printed from the typewheel of Figure 3;

Figure 6 is a section of tape printed from the typewheel of Figure 4;

Figure 7 represents diagrammatically the usual illumination of the sheet of a page projector; and Figures 8 and 9 indicate the illumination of the web of a page projector, in accordance with the present invention.

Referring first to Figure 1, I have shown diagrammatically a typewheel 10 of a telegraph printer or ticker having a cooperating platen 11 by which characters, such as stock quotations, are printed upon a strip 12 of transparent material such as "cellophane". The strip extends from a supply reel 13, between the typewheel 10 and platen 11, passing over the rollers 14 and 15. The tape then passes beneath an auto-control arm 16 and between the tape snubbing members 17 and 18, adapted to control its passage through the field of a projecting system. It is drawn through the projector by a feed roller 21 and rewound upon a reel 22. The tape feed mechanism forms no part of this invention and may be of any desired type. The form shown is completely disclosed in a co-pending application of R. F. Dirkes and G. I. Roberts, Ser. No. 554,574, filed August 1, 1931, and entitled "Tape control for projectors".

The area of the tape to be projected at any instant is of a length several times its width and in order to efficiently illuminate the same it was proposed, in the aforesaid application of Dirkes and Clark, to obtain an elliptical light beam by employing, between the point light source and the tape, either alone or in combination with other lenses, a lens having a cylindrical surface arranged with the axis of the cylinder of which the lens forms a part, parallel of the direction of travel of the tape, the lens being convex in planes normal to the surface of the tape. Such an illuminating arrangement has been shown in Figures 1 and 2 in which 23 indicates a source of light, the light being collected by a cylindrical lens 24 of rectangular shape on its major plane surface and which may be substantially co-extensive with the length of the tape being projected. Adjacent the lens 24 is a spherical lens 25 of similar dimensions. Lenses 24 and 25 may be separate elements or formed from one piece. These lenses serve to condense the beam emanating from the source 23, the light rays disposed in vertical planes (transversely of the tape) being condensed by both lenses 24 and 25 so as to converge upon the tape as shown in Figure 2. The rays is horizontal planes are condensed by the lens 25 only and hence to a lesser degree so as to cover the full length of the tape to be projected.

As stated in systems as heretofore proposed using ordinary spherical condensing lenses the length of tape projected has been restricted to five inches by the limitations of the illuminating system. In the scheme proposed by Dirkes and Clark, the illumination has been increased to a seven and one-half inch length of tape.

In order to obtain a still further increase in the number of quotations appearing on the screen I have compressed the printing on the tape in a longitudinal direction only, in such manner that a much greater number of characters can be carried on a definite length of tape. This is obtained by using a typewheel 10 having characters thereon which are reduced in width but not in height and adjusting the tape feeding mechanism of the printer so as to space the tape in accordance with the width of the printed characters. Figure 3 shows in development a portion of a typewheel of standard form showing the usual proportion of height and width of the characters, as ordinarily used and Figure 4 illustrates a portion of a typewheel, developed, having characters compressed to about one-half of the normal width but of normal height. With such a typewheel mounted upon the printer and the tape stepping mechanism adjusted to advance the tape half the usual distance, substantially twice the number of quotations can be printed upon a given length of tape. Figure 5 shows a tape having characters printed thereon in normal size and Figure 6 shows compressed printing thereon obtained from the typewheel of Figure 4.

In order to obtain a wide angled beam for the objective lens system 26, a cylindrical lens 27 is positioned immediately beneath the tape 12. The curvature of lens 27 is such as to converge the image lengthwise of the tape towards the objective lens whereas the transverse rays are not materially altered. This arrangement enables the objective lens system 26 and the screen 28 to be placed closer to the tape or with a given spacing of these elements to permit a larger image to be produced on the screen.

The objective lens system comprises a combination of spherical lenses 29 and a cylindrical lens 30. The cylindrical lens is disposed between the lens set 29 and the screen 28 and is positioned with the concave face thereof opposing the screen and with the axis of the cylindrical surface transversely of the elongated image produced from the tape. The longitudinal rays, which determine the width of the characters, are thus caused to diverge to a greater extent as they leave the surface of the lens 30 whereas the transverse rays determining the height of the characters are not altered by the cylindrical lens 30. Consequently each character appearing on the screen is widened and, therefore, appears in normal proportions.

It is obvious that with the same length of projected tape the screen 28 will necessarily be longer and will show a greater number of characters than with the usual projecting systems, or if the same numbers of characters are displayed the projected length of the tape may be decreased.

In Figure 5 I have shown a length of ordinary tape illuminated so as to cover four quotations. In Figure 6 the same number of quotations are illuminated with a beam of substantially half size. By thus tending to equalize the transverse and longitudinal dimensions of the beam the illumination may be made more efficient and of simpler design.

In Figures 7, 8 and 9 I have shown the invention as applied to a page projector. The usual page printer provides a sheet of a width of from four to eight inches. This sheet, if illuminated with an ordinary spherical lens, must have a circle of illumination of a diameter of approximately the width of the sheet. The circle of illumination of a page projector of the usual type is shown at 32 in Figure 7. In this figure it is assumed that the printing is in normal or full width characters, as indicated by the enlargement at 33. Obviously the number of full length lines which may be properly illuminated is small, the area within the rectangle 34 indicating the projectable surface of the sheet.

In Figure 8 and 9 I have shown a page printed in type compressed in width about one-half thereby enabling the same number of characters to be printed on each line on a page of one-half the normal width. As shown in Figure 8 the same or a greater number of lines may be illuminated with a much smaller beam 32' thereby reducing the difficulties incident to properly illuminating a full width sheet, or as shown in Figure 9 a much greater number of lines may be simultaneously projected. The illuminated area in Figure 8, is shown at 32" and the projectable area at 34". As shown under the glass 35 the characters on the tapes of Figures 8 and 9 are of the same height as those of Figure 7 but about one-half the width.

It is understood, of course, that upon projection the sheet is magnified in width about twice the magnification in height, through the use of a cylindrical lens such as the lens 30 of Figure 1 or its equivalent means.

It is evident that the invention is not limited to the particular class of projectors shown but may be used in projecting any object in which one dimension is considerably greater than the other. Since many changes may be made in the form of the invention without departing from the essential attributes thereof, I do not desire to be restricted to the particular embodiment shown and described but contemplate all such modifications and variations as coming within the scope of the appended claims.

What I claim is:

1. In combination a printing mechanism having type characters compressed in width relative to height, a tape adapted to receive a printed record therefrom, a tape feed mechanism for the printer adapted to feed the tape a distance commensurate with the width of said compressed characters and a projection system for producing a projected image from a length of said tape which is several times its width, said system having lens means for enlarging the projected image more longitudinally of the tape than transversely thereof.

2. In combination a printing mechanism having type characters compressed in one direction relative to the other, a web adapted to receive a printed record from said type, a tape feed mechanism for the printer adapted to feed the tape a distance commensurate with the width of said compressed characters and a projection system for projecting an image of said web, said system having lens means constructed and arranged to enlarge that image more in the direction of compression of said characters than transversely thereof.

3. In combination a printing mechanism having type characters compressed in one direction relative to the other, a web adapted to receive a printed record from said type, a tape feed mechanism for the printer adapted to feed the tape a distance commensurate with the width of said compressed characters and a projection system for projecting an image of said web, said system having an objective lens system, one element of which has a cylindrical surface arranged with the parallel elements of said surface transverse to the direction of compression of said characters, whereby the image produced is magnified more in said first direction than transversely thereof.

4. In combination a printing mechanism having type characters compressed in one direction relative to the other, a web adapted to receive a printed record from said type, a tape feed mechanism for the printer adapted to feed the tape a distance commensurate with the width of said compressed characters and a projection system for projecting an image of said web, said system having an objective lens system, one element of which has an aspherical surface of revolution arranged to enlarge the image produced, more in the direction of compression of said characters than transversely thereof.

5. The method of producing a printed image on a screen, comprising printing a plurality of lines on a web the individual characters of said printing being compressed in width, projecting an image of said plurality of lines simultaneously on a screen and magnifying the image produced more longitudinally of each line than transversely thereof, whereby the characters appear in normal proportions on said screen.

ROBERT F. DIRKES.